United States Patent [19]

Takahashi et al.

[11] Patent Number: 5,278,810
[45] Date of Patent: Jan. 11, 1994

[54] MAGNETO-OPTICAL RECORDING MEDIUM WHEREON RECORDING IS CARRIED OUT WITH AN OVERWRITING FUNCTION

[75] Inventors: Akira Takahashi; Junichiro Nakayama; Hiroyuki Katayama; Kenji Ohta, all of Nari, Japan

[73] Assignee: Sharp Kabushiki Kaisha, Osaka, Japan

[21] Appl. No.: 909,969

[22] Filed: Jul. 7, 1992

[30] Foreign Application Priority Data

Jul. 8, 1991 [JP] Japan .................. 3-167206

[51] Int. Cl.$^5$ ............................................ G11B 11/00
[52] U.S. Cl. ...................................... 369/13; 360/59; 360/114; 365/122
[58] Field of Search ............... 369/13, 14, 275.2, 275.3; 360/59, 114, 131; 365/122; 428/694, 900

[56] References Cited

U.S. PATENT DOCUMENTS

| | | | |
|---|---|---|---|
| 5,016,232 | 5/1991 | Tadokoro et al. | 369/13 |
| 5,018,119 | 5/1991 | Aratani et al. | 369/13 |
| 5,051,970 | 9/1991 | Ishii et al. | 369/13 |
| 5,132,945 | 7/1992 | Osato et al. | 369/13 |
| 5,153,868 | 10/1992 | Fujinaga | 369/110 |

OTHER PUBLICATIONS

Ohta et al., "Read Out Mechanism of Magnetically Induced Super Resolution" J. Magn. Soc. Jpn., vol. 15, Supplement No. S1 (1991), pp. 319-322.

*Primary Examiner*—Robert J. Pascal
*Assistant Examiner*—Ali Neyzari
*Attorney, Agent, or Firm*—David G. Conlin; George W. Neuner

[57] ABSTRACT

A magneto-optical recording medium is consisted of a recording layer, a readout layer and a writing layer. The readout layer is made of rare earth-transition metal alloys wherein an easy magnetization axis is parallel to the recording layer at room temperature, and the easy magnetization axis is perpendicular to the recording layer as the temperature of the readout layer is raised above a predetermined temperature by irradiating thereon with a light beam. The writing layer is made of rare earth-transition metal alloys having such coercive force that a magnetization direction thereof is switched by an external magnetic field at room temperature and Curie temperature that is above Curie temperature of the recording layer. With the above arrangement, an overwriting function can be achieved by adjusting a light intensity of the light beam so that the temperature falls within the range between the Curie temperature of the writing layer and the Curie temperature of the recording layer, or above the Curie temperature of the writing layer.

22 Claims, 13 Drawing Sheets

ROOM TEMPERATURE ~ $T_1$ $T_1$ ~ $T_{curie}$

PRIR ART

MAGNETO-OPTICAL RECORDING MEDIUM WHEREON RECORDING IS CARRIED OUT WITH AN OVERWRITING FUNCTION

FIELD OF THE INVENTION

The present invention relates to a recording medium to be adopted in magneto-optical recording devices, such as a magneto-optical disk, a magneto-optical tape, magneto-optical card, etc.

BACKGROUND OF THE INVENTION

There has been a limit in improving the recording density of a magneto-optical recording medium by being dependent on the size of a light spot of a light beam used for recording and reproducing on and from the recording medium. This is because a diameter of the light spot on the recording medium becomes a diameter of a recorded bit. However, recently, a magneto-optical recording medium has been proposed wherein recorded bits with a size smaller than the size of a light spot can be reproduced.

Normally, the light beam for use in optical recording is converged to a diffraction limit by a converging lens. Therefore, the light intensity distribution shows a Gaussian distribution, and thus the temperature distribution due to the light beam on the recording medium also exhibits the Gaussian distribution. As a result, a spot having a temperature above a predetermined temperature becomes smaller in size than the size of the light spot. Consequently, a significant improvement in the recording density can be achieved if only the spot having a temperature above the predetermined temperature is used for reproduction.

Referring to FIG. 16, the following description will discuss a magneto-optical disk wherein a recorded bit with a size smaller than the size of a light spot can be reproduced.

The magneto-optical disk is mainly consisted of a substrate 21 having a readout layer 23 and a recording layer 24 formed on a surface thereof. The recording layer 24 has great coercive force at room temperature. On the other hand, the readout layer 23 has small coercive force at room temperature. When the temperature of an area of the readout layer 23 to be reproduced is raised by irradiating thereon with a reproduction-use light beam, the magnetization direction thereof becomes coincident with the magnetization direction of the recording layer 24 due to the effect of the recording layer 24. That is, the magnetization of the recording layer 24 is copied to the readout layer 23 by exchange coupling force between the readout layer 23 and the recording layer 24.

Recording on the described magneto-optical disk is executed by the ordinary thermomagnetic writing method. When the recorded bits are to be reproduced, it is necessary to initialize the magnetization direction of the readout layer 23 so as to make it coincident with the predetermined direction (upward in the figure) by applying an external magnetic field for initializing from a magnetic field generating device 26. Then, by projecting thereto a reproduction-use light beam 27, the temperature of the readout layer 23 is locally raised. As a result, the portion having a temperature rise of the readout layer 23 has small coercive force, and the magnetization direction of the recording layer 24 is copied to the readout layer 23 by the exchange coupling force. In this way, since only the information stored in the center area which has received the reproduction-use light beam 27 and undergone a temperature rise is reproduced, recorded bits with a size smaller than that of the light spot are permitted to be read out.

However, when using the discussed magneto-optical disk, the following problem arises. During reproduction, a recorded bit that has been copied to the readout layer 23 from the recording layer 24 remains as it is even after the temperature of the spot has cooled off. This means that when a spot to be irradiated by the light beam 27 is shifted by a rotation of the magneto-optical disk so as to reproduce the next bit, the bit previously copied still exists within the light beam 27 and tends to be reproduced. This causes noise and has prevented improvement in recording density.

Furthermore, the magneto-optical disk having the described configuration cannot be provided with the overwriting function through a light intensity modulation method. This presents another problem by requiring a long time for data writing.

SUMMARY OF THE INVENTION

An object of the present invention is to provide a magneto-optical recording medium including recorded bits each of which having a diameter smaller than that of a light spot, whereon a recording operation can be carried out using an overwriting function through a light intensity modulation method.

In order to achieve the above object, the magneto-optical recording medium in accordance with the present invention comprising a substrate through which a light beam is to be transmitted and a recording-reproduction layer whereon information is recorded magneto-optically is characterized by the following arrangements.

The recording-reproduction layer includes a readout layer and a recording layer and a writing layer made of rare earth-transition metal alloys, each of which has its Curie temperature. A magnetic condition of the readout layer exhibits in-plane magnetization at room temperature. On the other hand, when the temperature of the readout layer is raised above a predetermined temperature by irradiating thereon with a light beam, a transition of the magnetic condition occurs from the in-plane magnetization to the perpendicular magnetization. (Here, the in-plane magnetization indicates a magnetic characteristic wherein an easy magnetization axis is parallel to the recording layer surface, and the perpendicular magnetization indicates a magnetic characteristic wherein the easy magnetization axis is perpendicular to the recording layer surface.) A recording layer is provided for storing information. A writing layer has such small coercive force that the magnetization direction thereof is switched by external recording magnetic filed at room temperature. In addition, the Curie temperature of the writing layer is above the Curie temperature of the recording layer.

Here, the readout layer, the recording layer and the writing layer are laminated in this order. Further, it is arranged such that when the temperature of the recording-reproduction layer is raised to a temperature within the range between the Curie temperature of the recording layer and the Curie temperature of the writing layer by irradiating thereon with a light beam, a magnetization direction of the recording layer is arranged in the magnetization direction of the writing layer. Whereas, when the temperature of the recording-reproduction layer is raised above the Curie temperature of the writing layer, the magnetization direction of the recording layer is arranged in the magnetization direction of an external recording magnetic field.

When recording operation is carried out on the magneto-optical disk having the above configuration using the overwriting function through the light intensity modulation method, the writing layer is initialized by applying thereto an initialization-use magnetic field prior to recording so that the magnetization direction thereof is arranged in one direction. Next, the temperature of the recording-reproduction layer is raised to a temperature within the range between the Curie temperature of the recording layer and the Curie temperature of the writing layer by adjusting a light intensity of the light beam. In this way, the magnetization direction of the writing layer, i.e., the initialized magnetization direction is copied to the recording layer by exchange coupling force between the recording layer and the writing layer. Or the temperature of the recording-reproduction layer is raised above the Curie temperature of the writing layer by adjusting the light intensity of the light beam. Consequently, the magnetization direction of the recording layer is arranged in the magnetization direction of an externally applied recording magnetic field.

As described, by adjusting the light intensity of the light beam, a recording operation can be carried out on the magneto-optical recording medium using the overwriting function. Here, the magnetic condition of the readout layer exhibits in-plane magnetization and thus has no effect on the recording operation.

On the other hand, when reproducing information, the magnetic condition of the readout layer exhibits the in-plane magnetization at room temperature and does not show the magneto-optical effect (polar Kerr effect) that is effective on a perpendicular incident light beam. Further, when the temperature of the central portion thereof is raised by irradiating thereon with a reproduction-use light beam, a transition of the magnetic condition occurs in the readout layer from the in-plane magnetization to the perpendicular magnetization. As a result, the magnetization direction of the readout layer is arranged in the magnetization direction of the recording layer. In this way, the readout layer shows the magneto-optical effect, thereby permitting to perform a reproducing operation. Further, when the reproduction-use light beam is shifted, the previously irradiated spot has cooled off. Thus, the magnetic condition of the readout layer again exhibits in-plane magnetization, thereby no longer showing the magneto-optical effect.

According to the above arrangement, the reproducing operation is carried out only with respect to a central portion of a light spot having a temperature above a predetermined temperature. This means that the recording density is determined by a temperature distribution but by a diameter of the light spot. In this way, as long as a enough signal intensity required for reproduction is ensured, in principle, a significant increase can be obtained in the recording density.

In addition, the magnetic condition of the readout layer exhibits the in-plane magnetization at room temperature, and thus has no effect on the recording operation. Moreover, the readout layer does not show the magneto-optical effect that is effective on the perpendicular incident light. This permits to reduce the occurrence of crosstalk from the adjacent track.

BRIEF DESCRIPTION OF THE DRAWINGS

FIG. 1 shows a recording operation on a magneto-optical recording medium.

FIG. 2 shows a recording operation on a magneto-optical recording medium of the present invention.

FIG. 3 is a graph showing temperature dependencies of respective coercive forces of a recording layer, a readout layer and a writing layer.

FIG. 4 shows magnetic conditions of rare earth-transition metal alloy to be used as a readout layer.

FIG. 5 shows the relationship between an external magnetic field to be applied onto a readout layer and a Kerr rotation angle, from room temperature to temperature $T_1$.

FIG. 6 shows the relationship between an external magnetic field to be applied onto a readout layer and a Kerr rotation angle, from temperature $T_1$ to temperature $T_c$.

FIG. 7 shows the relationship between the external magnetic field to be applied onto a readout layer and the Kerr rotation angle, from temperature $T_c$ to temperature $T_2$.

FIG. 8 shows the relationship between the external magnetic field to be applied onto readout layer and the Kerr rotation angle, from temperature $T_2$ to temperature $T_{curie}$.

FIG. 9 shows a reproducing operation from a magneto-optical recording medium.

FIG. 10 shows a recording operation on a magneto-optical recording medium having another configuration of the present invention.

FIG. 11 shows magnetic conditions of rare earth-transition metal alloy to be used as the readout layer in FIG. 10.

FIG. 12 shows the relationship between the external magnetic field to be applied onto readout layer of FIG. 10 and the Kerr rotation angle, from room temperature to temperature $T_1$.

FIG. 13 shows the relationship between the external magnetic field to be applied onto readout layer of the present invention and the Kerr rotation angle, from temperature $T_1$ to temperature $T_{curie}$.

DETAILED DESCRIPTION OF THE PREFERRED EMBODIMENTS

Referring to FIGS. 1 through 9, the following description will discuss one embodiment of the present invention.

Figure 1:
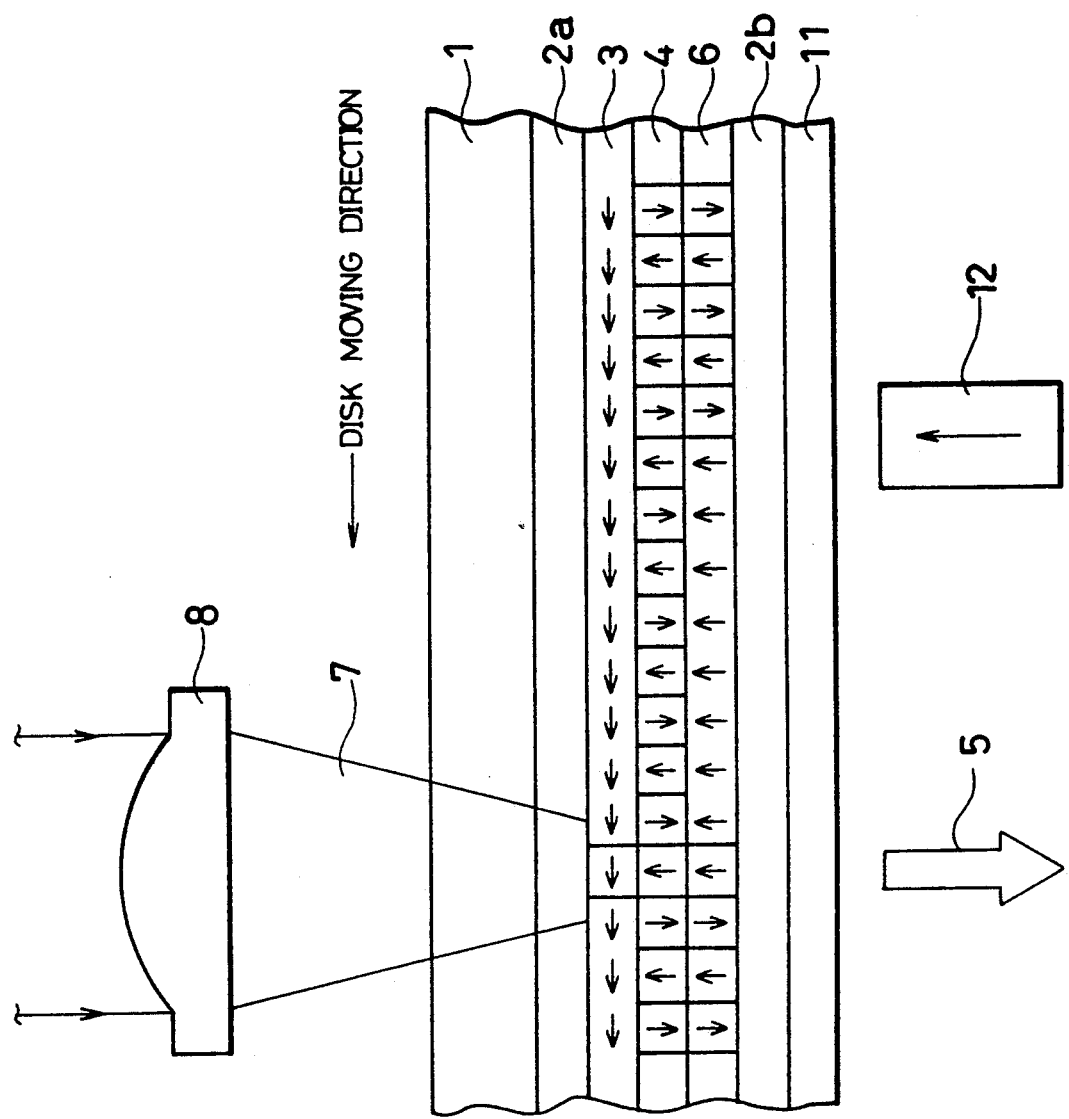
FIG. 1 through FIG. 9 show one embodiment of the present invention.

As shown in FIG. 1, a magneto-optical disk as a magneto-optical recording medium in accordance with the present embodiment is consisted of a substrate 1, a transparent dielectric film 2a, a readout layer 3, a recording layer 4, a writing layer 6, a transparent dielectric film 2b and an overcoat film 11 that are laminated in this order. Further, a recording-reproduction layer is consisted of the readout layer 3, the recording layer 4 and the writing layer 6.

Figure 4:
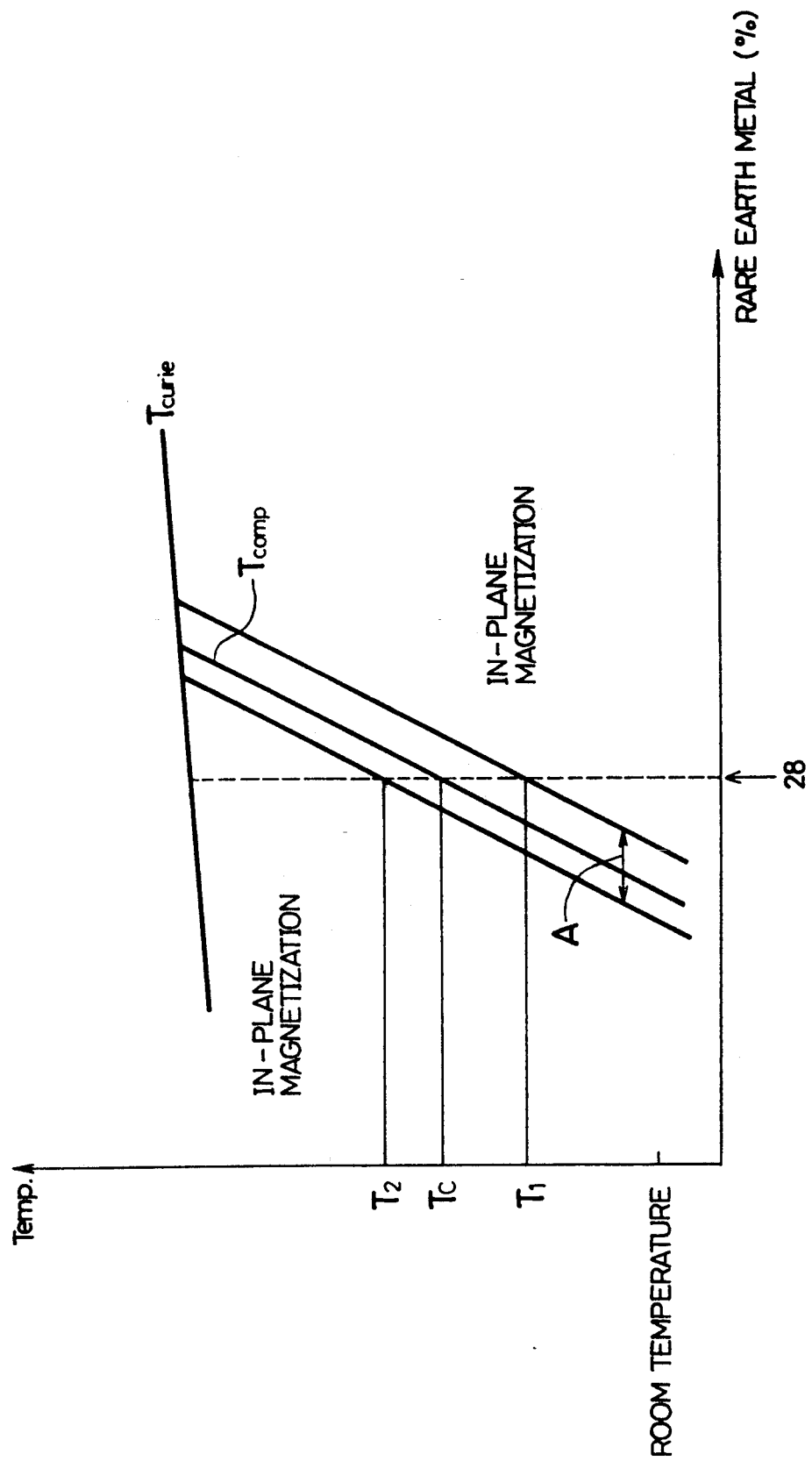
Figure 5:
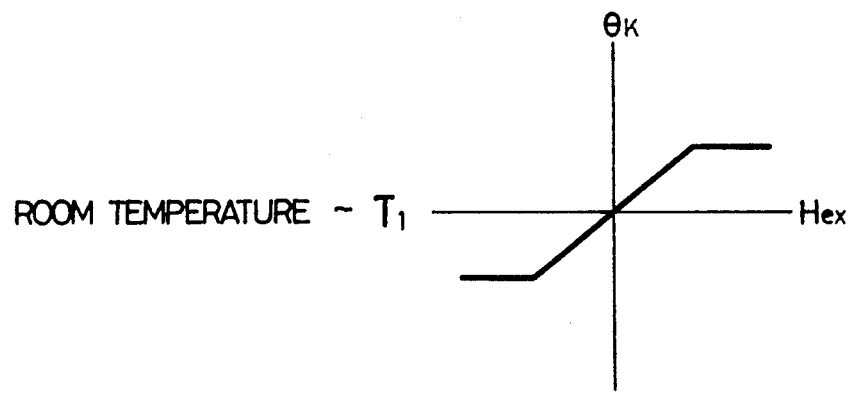
Figure 6:
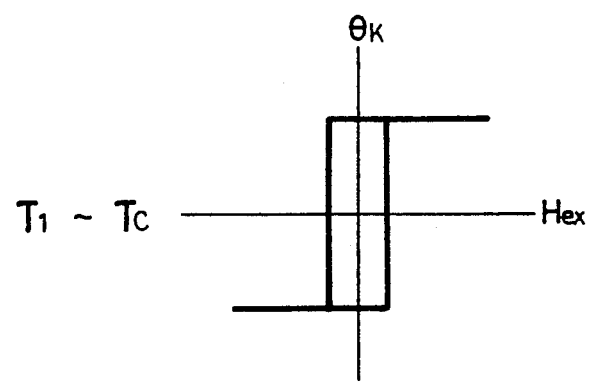
Figure 7:
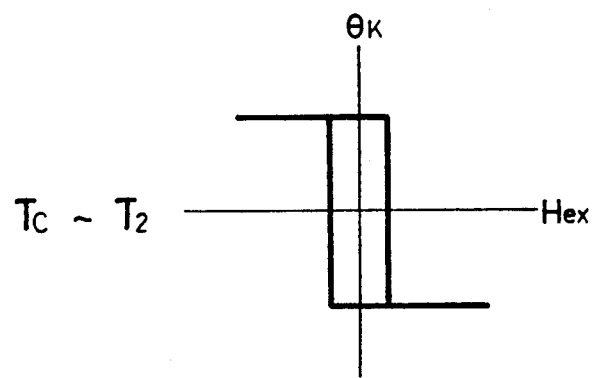
Figure 8:
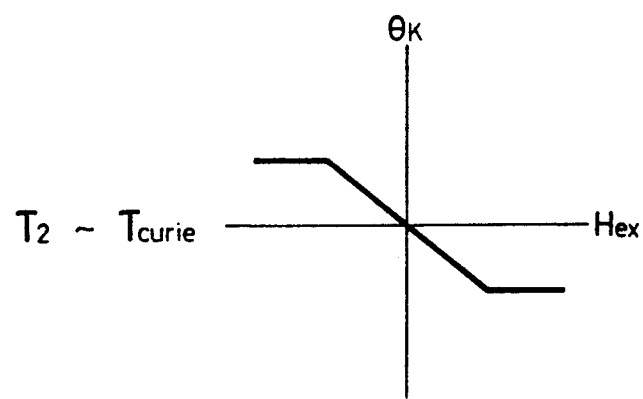

FIG. 4 shows the magnetic condition of rare earth-transition metal alloys used in the readout layer 3, where a range in which the magnetic condition of the alloys exhibits a perpendicular magnetization is extremely narrow. This is because the perpendicular magnetization only appears in the vicinity of a compensating composition ($T_{comp}$) where the magnetic moments of the rare-earth metal and the transition metal balance one another (range A in the figure). Here, temperature dependence of the the magnetic moments of the rare-earth metal and the transition metal are respectively different from one another. That is, at high temperatures, the magnetic moment of the transition metal is set greater than that of the rare-earth metal. Therefore, it is arranged that the content of the rare-earth metal is set greater that in the compensating composition at room temperature (composition indicated by dot lines in the figure), and such an alloy then exhibits a in-plane magnetization at room temperature without showing the perpendicular magnetization. Whereas, when a temperature of the alloy is raised above the temperature $T_1$, the magnetic moment of the transition metal becomes relatively greater until it balances the magnetic moment of the rare-earth metal, thereby permitting the alloy to show the perpendicular magnetization as a whole. Further, when a temperature rises above temperature $T_2$, the balance is no longer kept, and thus the alloy exhibits the in-plane magnetization again.

Figure 3:
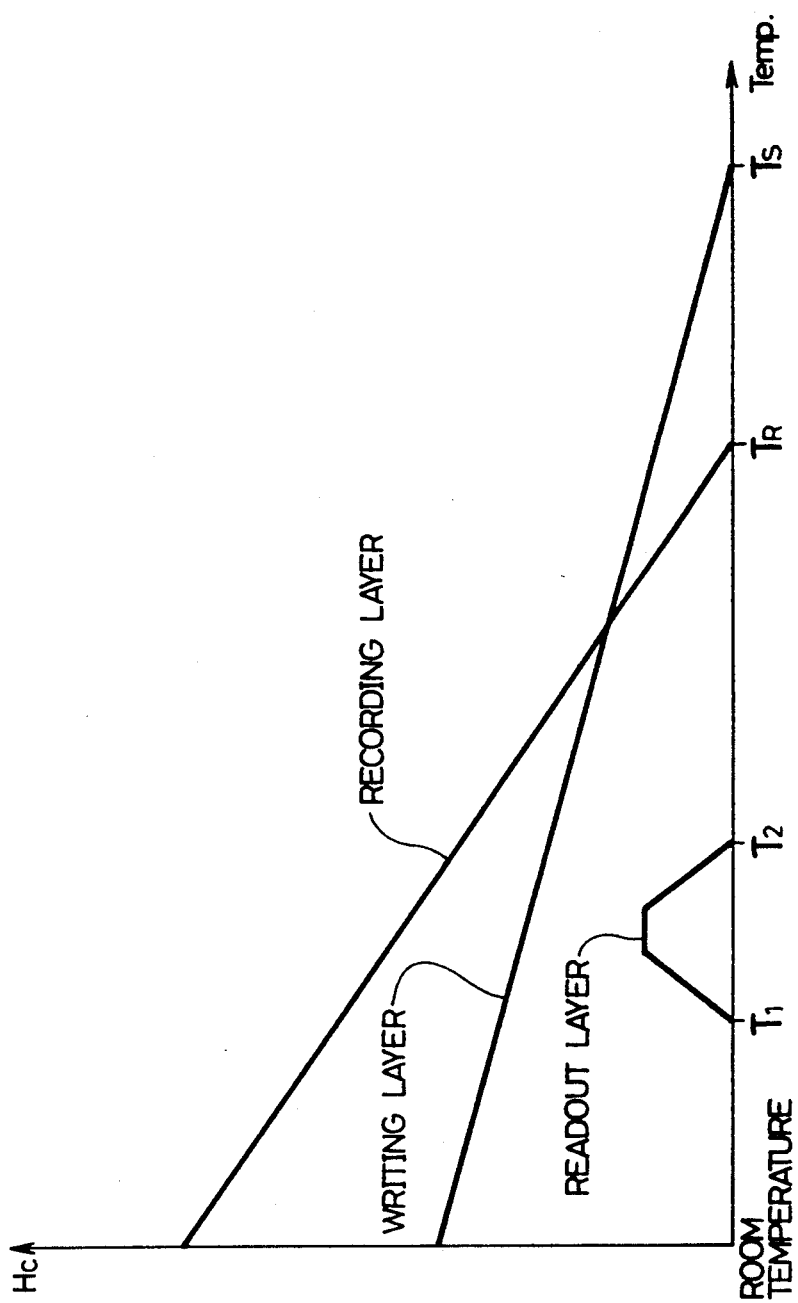

FIG. 3 shows temperature dependencies of respective coercive forces $H_c$ of the readout layer 3, the writing layer 6 and the recording layer 4. The recording layer 4 has greater coercive force at Curie temperature $T_R$ that is below Curie temperature $T_S$ of the writing layer 6 and at room temperature. Whereas, the magnetization direction of the recording layer 4 becomes coincident with the magnetization direction of the writing layer 6 at high temperature. On the other hand, the writing layer 6 has small coercive force at low temperature, and the magnetization direction thereof is uniformly arranged in one direction by applying thereto an initialization-use external magnetic field.

In the present embodiment, $Gd_{0.28}(Fe_{0.8}Co_{0.2})_{0.72}$ is employed as the readout layer 3, whose Curie temperature is on the order of 300° C.–400° C. As described earlier, since the content of the rare-earth metal is set greater, it exhibits the in-plane magnetization at room temperature, and the compensating composition is marked in the vicinity of 100° C. Here, $T_1$, $T_C$ and $T_2$ respectively represent 90° C., 120° C. and 150° C. On the other hand, $Dy_{0.23}(Fe_{0.82}Co_{0.18})_{0.77}$ is employed as the recording layer 4 whose Curie temperature $T_R$ is set on the order of 150° C.–250° C. Further, $Tb_{0.25}(Fe_{0.8}Co_{0.2})_{0.75}$ is used for the writing layer 6, whose Curie temperature $T_S$ is 300° C.

The thickness of the transparent dielectric film 2a is set to be a value that is obtained by dividing one-forth of the wavelength of a reproduction-use light beam by the refractive index. For example, assuming that the wavelength of the reproduction-use light beam is 800 nm, the film thickness of the transparent dielectric film 2a is on the order of 80 nm–100 nm. In addition, the transparent dielectric film 2b is a protective film made of a nitride, having a thickness of 50 nm.

FIGS. 5 through 8 respectively show the relationships between the externally-applied magnetic field $H_{ex}$ and the Kerr rotation angle $\theta_K$, that is, the magnetic characteristics within respective ranges: from room temperature to temperature $T_1$; from temperature $T_1$ to temperature $T_C$; from temperature $T_C$ to temperature $T_2$; and from temperature $T_2$ to the Curie temperature $T_{curie}$.

The graph shows an abruptly rising hysteresis characteristic, i.e., the perpendicular magnetization, within the range from temperature $T_1$ to temperature $T_2$; however, within the range from room temperature to temperature $T_1$ as well as within the range from temperature $T_2$ to the Curie temperature $T_{curie}$, no hysteresis characteristic is shown.

Figure 2:
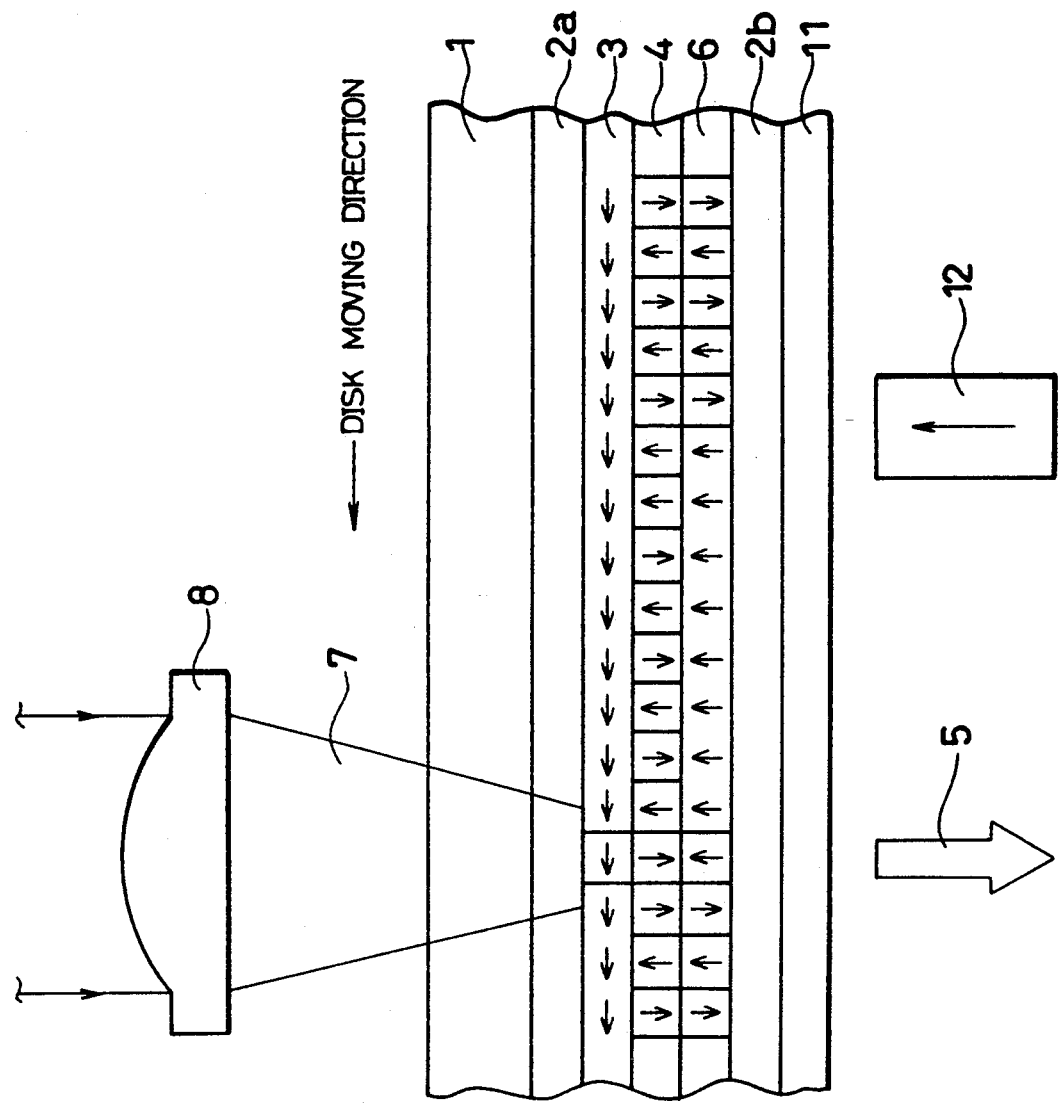

The following description will discuss the recording operation on the magneto-optical disk having the described arrangement using the overwriting function through an optical modulation method referring to FIGS. 1 and 2.

First, the initialization-use magnetic field is applied onto the magneto-optical disk by a magnetic field generation device 12. Here, since the writing layer 6 has small coercive force at room temperature, the magnetization direction of the writing layer 6 is arranged in the magnetization direction of the applied magnetic field (upward in the figure), thereby completing the initialization of the writing layer 6.

Next, a light beam 7 is projected onto a portion to be recorded from the side of the substrate 1 through a converging lens 8. Whereas, a recording magnetic field 5 whose magnetization direction is opposite to the magnetization direction of the initialization-use magnetic field is applied to the portion. For example, as shown in FIG. 1, when the magnetization direction of the recorded portion of the recording layer 4 is coincident with that of the initialization-use magnetic field (upward in the figure), the temperature of the irradiated spot is raised above the Curie temperature $T_s$ of the writing layer 6 by adjusting the light intensity of the light beam 7. Here, since the Curie temperature $T_R$ of the recording layer 4 is below the Curie temperature $T_s$, both the recording layer 4 and the writing layer 6 have respective temperatures above the respective Curie temperatures. As a result, the respective magnetization directions become coincident with the magnetization direction of the recording magnetic field 5, thereby completing the recording operation.

On the other hand, as shown in FIG. 2, when the magnetization direction of the recorded portion of the recording layer 4 is opposite to that of the initialization-use magnetic field (downward in the figure), and thus needs to be reversed so as to make it coincident with that of the initialization-use magnetic field, the temperature of the irradiated spot of the recording layer 4 is raised to a temperature within the range between the Curie temperature $T_R$ of the recording layer 4 and the Curie temperature $T_S$ of the writing layer 6 by adjusting the light intensity of the light beam 7. In this way, the magnetization direction of the writing layer 6 is copied to the recording layer 4 by exchange coupling force between the recording layer 4 and the writing layer 6. Consequently, the magnetization direction of the recording layer 4 is arranged in the magnetization direction of the initialization-use magnetic field.

Additionally, in either one of the above cases, the temperature of the readout layer 3 is raised above temperature $T_2$ by irradiating thereon with the light beam 7, thus the magnetic condition of the readout layer 3 exhibits the in-plane magnetization. In other words, this does not affect the recording operation.

Figure 9:
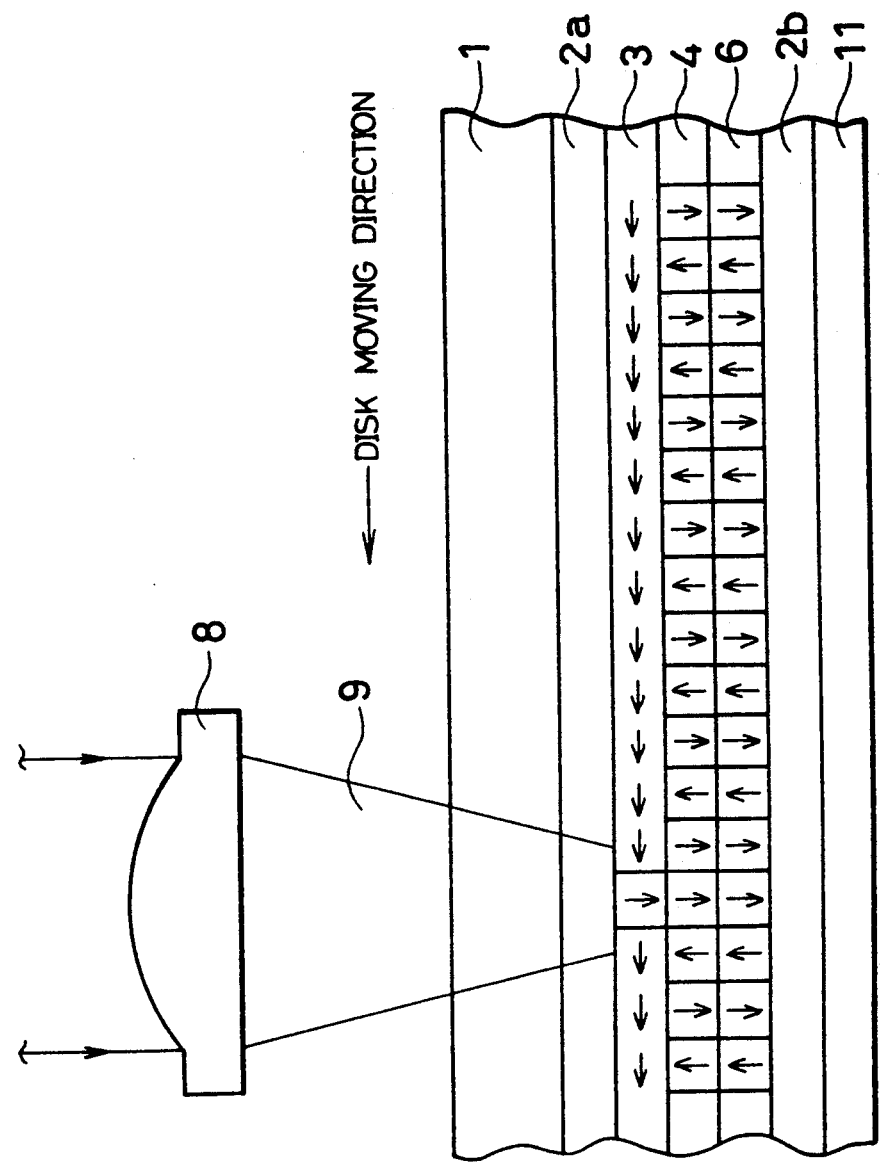

When reproducing from the magneto-optical disk having the above-mentioned arrangement, as shown in FIG. 9, a reproduction-use light beam 9 is projected onto the readout layer 3 through the converging lens 8 from the side of the substrate 1. In this case, assuming that recordings have been made on the recording layer 4, for example, as shown in FIG. 9 (i.e., a magnetization direction is downward in the figure), a temperature rise occurs at a spot of the readout layer 3, located in the vicinity of the center of the reproduction-use light beam 9, to the vicinity of 100° C., i.e., between $T_1$ and $T_2$. Then, at the spot having a temperature rise, a transition of the magnetic condition occurs from the in-plane magnetization to the perpendicular magnetization. In this way, the magnetization direction of the recording layer 4 is copied to the readout layer 3 by exchange coupling force between the readout layer 3 and the recording layer 4, whereby the magnetization direction of the readout layer 3 is coincident with the magnetization direction of the recording layer 4.

After the transition of the magnetic condition from the in-plane magnetization to the perpendicular magnetization has occurred in the spot of the readout layer 3 having the temperature rise, the Kerr effect is shown, whereby the information recorded on the recording layer 4 is reproduced according to the reflected light from the spot.

On the other hand, in other areas on the readout layer 3 except the spot in the vicinity of the center of the reproduction-use light beam 9, the temperature is not raised above $T_1$, and thus the in-plane magnetization is maintained. As a result, the Kerr effect is not shown with respect to the perpendicular incident light beam.

When the reproduction-use light beam 9 is shifted so as to reproduce the next recorded bit, the temperature of the previous bit has cooled off and the transition of the magnetic condition of the readout layer 3 occurs from the perpendicular magnetization to the in-plane magnetization. Accordingly, the Kerr effect is not shown at the spot having the temperature drop. Consequently, the interference by signals from the adjoining bits, which causes noise, is eliminated.

Since the Kerr effect is obtained only in the vicinity of the center of the reproduction-use light beam, as long as enough signal intensity is ensured, the application of this magneto-optical disk for information recording and reproduction makes it possible to reproduce a recorded bit with a size smaller than the diameter of the light spot, resulting in a significant increase in the recording density.

Besides the above-mentioned $Gd_{0.28}(Fe_{0.8}Co_{0.2})_{0.72}$, for example, $Gd_{0.25}Co_{0.75}$ may be preferably employed as a material for the readout layer 3. In this case, since $Gd_{0.25}Co_{0.75}$ has smaller coercive force than $Gd_{0.28}(Fe_{.8}Co_{0.2})_{0.72}$, in addition to the effect of the above embodiment, one of the disturbing factors to the externally-applied magnetic field at a temperature where the readout layer exhibits the perpendicular magnetization during recording can be minimized, thereby making smoother the shape of the recorded bit.

Referring to FIGS. 10 through 13, the following description will discuss another embodiment of the present invention. For the sake of convenience, members having the same function as in the first embodiment will be designated by the same code and their description will be omitted.

A magneto-optical recording medium of the present embodiment differs from that of the first embodiment in that only a recording layer 13 made of $(Gd_{0.8}Tb_{0.2})_{0.35}Fe_{0.65}$ is used instead of the readout layer 3 and the recording layer 4. Namely, as shown in FIG. 10, the magneto-optical recording disk is consisted of the substrate 1, the transparent dielectric film 2a, a recording layer 13, the writing layer 6, the transparent dielectric film 2b and the overcoat film 11 that are laminated in this order.

Figure 11:
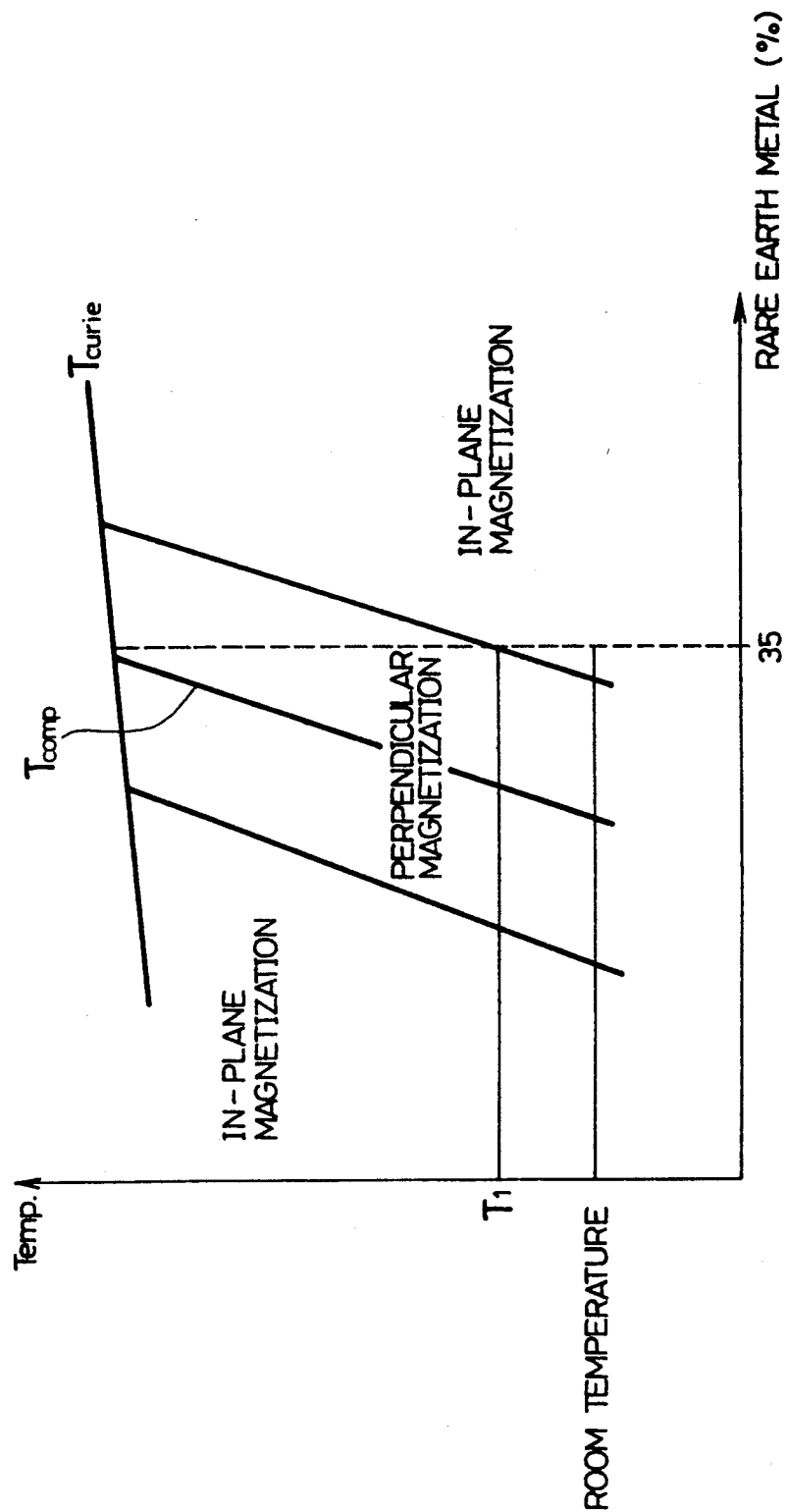
Figure 12:
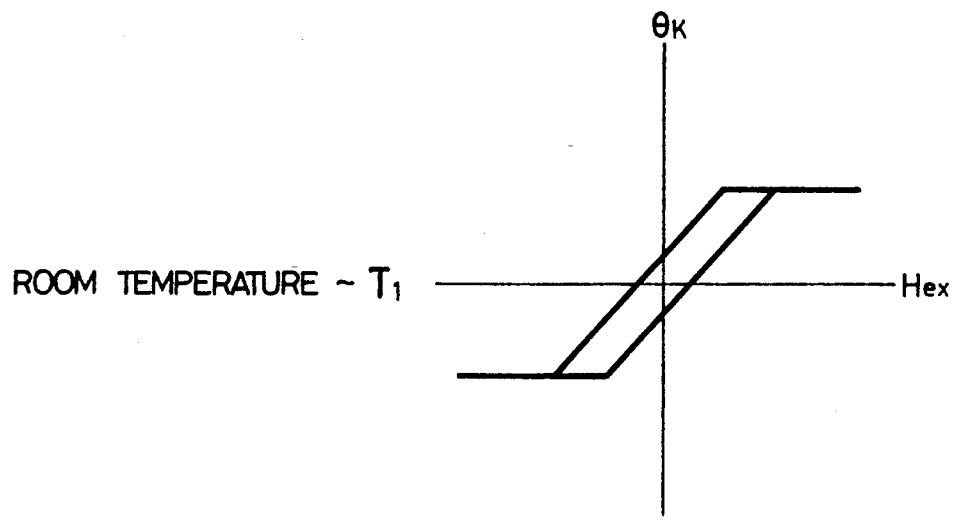
Figure 13:
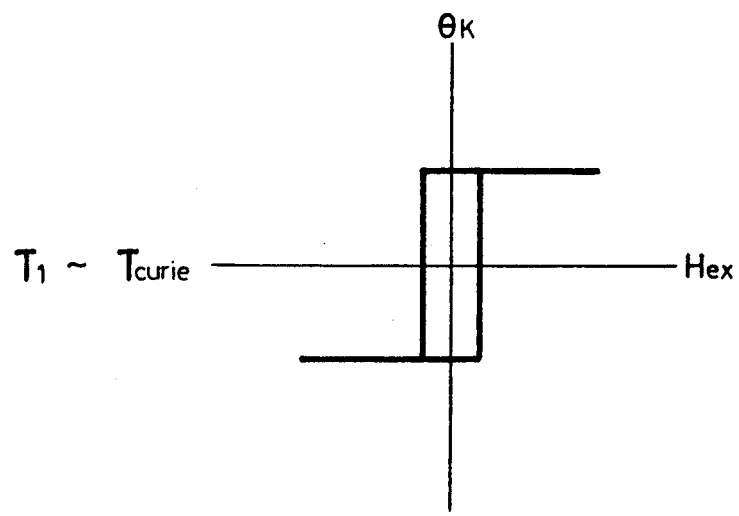

FIG. 11 shows magnetic conditions of GdTbFe. As shown by dot lines in the figure, $(Gd_{0.8}Tb_{0.2})_{0.35} Fe_{0.65}$ used in the present embodiment does not fully exhibit in-plane magnetization at room temperature, and have some components of perpendicular magnetization and thus stores information. In addition, the Curie temperature of the recording layer 13 is below the Curie temperature of the writing layer 6. FIGS. 12 and 13 show the relationship between the externally applied magnetic field $H_{ex}$ to be applied on $(Gd_{0.8}Tb_{0.2})_{0.35} Fe_{0.65}$ and the Kerr rotation angle $\theta_K$.

Figure 10:
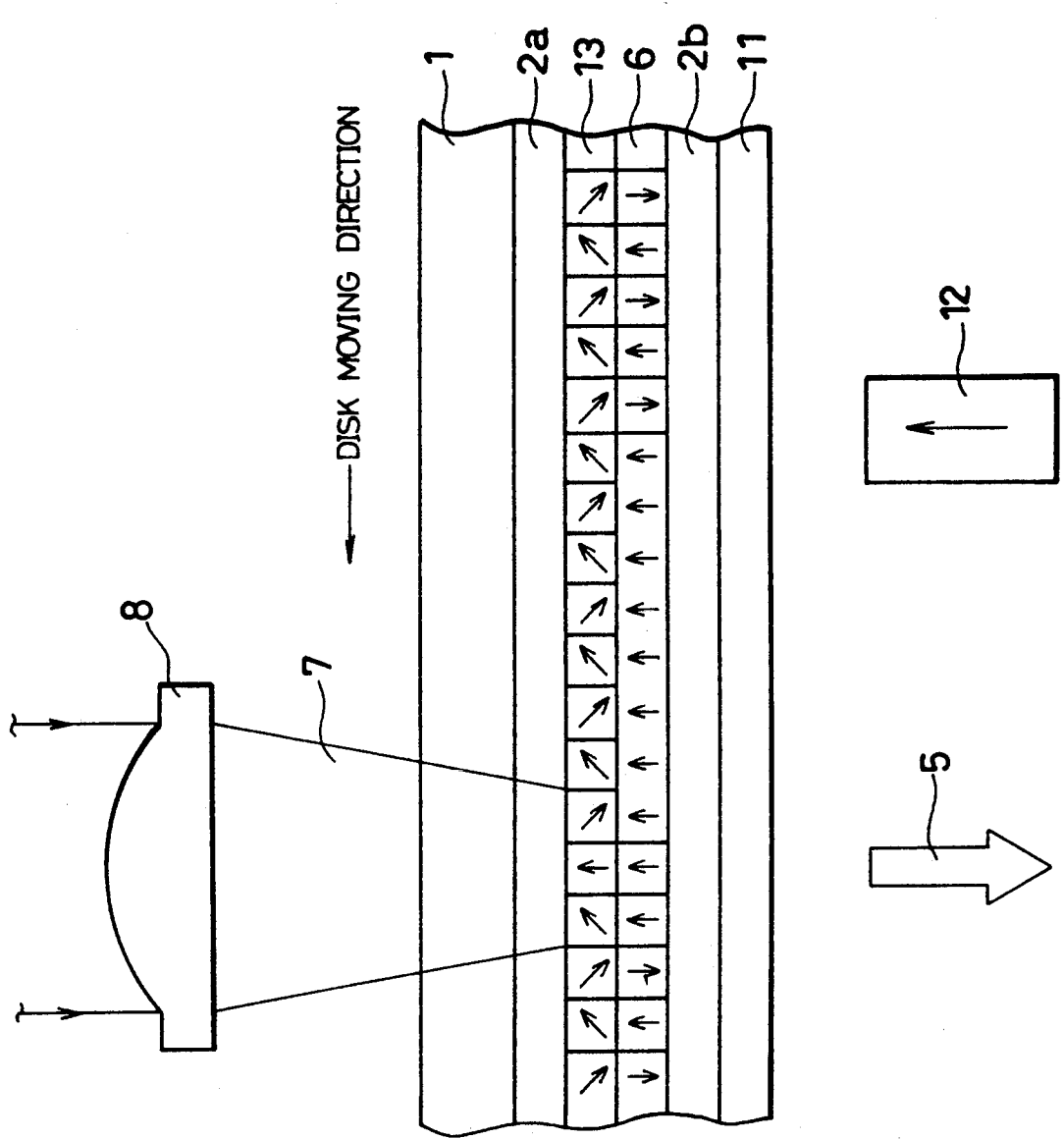
FIGS. 10 through 13 show another embodiment of the present invention.

When recording on the magneto-optical disk using the overwriting function, as shown in FIG. 10, the temperature of the irradiated spot is raised above Curie temperature of the writing layer 6, or within the range between the Curie temperature of the recording layer 13 and Curie temperature of the writing layer 6 by adjusting the light intensity of the light beam 7 as in the case of the first embodiment. As a result, the magnetic condition of the recording layer 13 exhibits a perpendicular magnetization that is arranged in a predetermined direction (upward or downward in the figure). Further, when the light beam 7 is shifted, and thus the temperature of the previously recorded bit has cooled off, the magnetic condition of the recording layer 13 exhibits in-plane magnetization while keeping components of perpendicular magnetization.

On the other hand, when reproducing information, only the recorded bit on the recording layer 13 having a temperature rise above temperature $T_1$ shown in FIG. 11 exhibits the perpendicular magnetization. This means that the light reflected from the spot having the temperature rise shows the Kerr effect, thereby reproducing the information.

As described, the employed magneto-optical disk has a double-layered magnetic layer composed of the recording layer 13 and the writing layer 6. This permits to simplify the manufacturing process thereof in comparison with the case of employing the magneto-optical disk of the first embodiment having a magnetic layer consisted of three layers.

Figure 14:
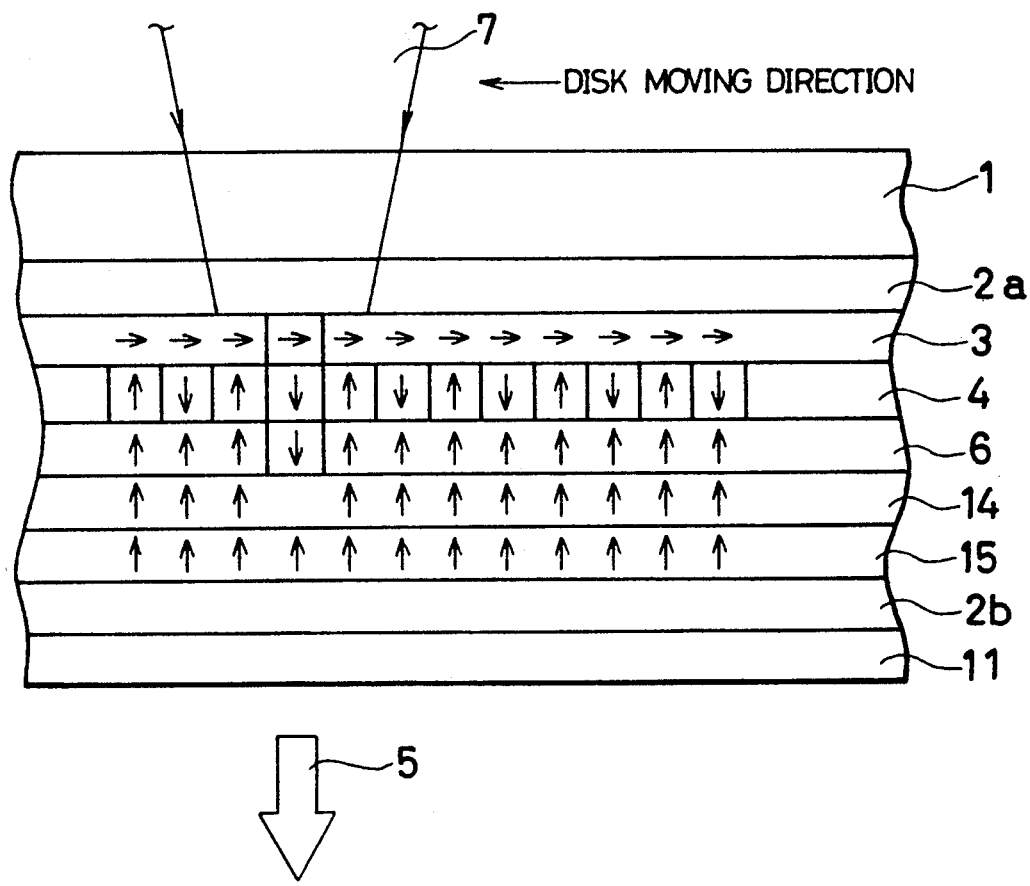
FIG. 14 shows a recording operation on a magneto-optical recording medium having another configuration of the present invention.

A still another embodiment of the present invention is described hereinbelow referring to FIG. 14. For the sake of convenience, members having the same function as in the first embodiment will be designated by the same code and their description will be omitted.

A magneto-optical disk of the present embodiment is consisted of the substrate 1, the transparent dielectric film 2a, the readout layer 3, the recording layer 4, the writing layer 6, a switching layer 14, an initialization-use magnetic layer 15, the transparent dielectric film 2b and the overcoat film 11 that are laminated in this order. Namely, the magneto-optical disk of the present embodiment differs from that of the first embodiment in that the switching layer 14 and the initialization-use magnetic layer 15 are further laminated under the writing layer 6.

The initialization-use magnetic layer 15 whose Curie temperature is above 300° C. has large coercive force at whole range of temperature, and the magnetization direction thereof is always fixed to one direction. For the switching layer 14, for example, TbFe may be used, and in this case Curie temperature thereof is 120° C. Therefore, at room temperature, the magnetization direction of the initialization-use magnetic layer 15 is copied to the switching layer 14. Further, the magnetization direction of the switching layer 14 is copied to the writing layer 6. Consequently, the magnetization direction of the writing layer 6 is arranged in the magnetization direction of the initialization-use magnetic layer 15.

In the case of recording information, when the temperature of the switching layer 14 is raised above the Curie temperature thereof by irradiating thereon with the light beam 7, the magnetization direction of the initialization-use magnetic layer 15 is no longer copied. Thus, the writing layer 6 is not affected by the magnetization direction of the initialization-use magnetic layer 15. As a result, the temperature of the irradiated spot is raised to a predetermined temperature by adjusting the light intensity of the light beam 7 as in the case of the first embodiment, whereby the magnetization direction of the recording layer 4 is arranged either in the magnetization direction of the recording magnetic field 5 or the writing layer 6, thereby recording information. In addition, the readout layer 3 exhibits the in-plane magnetization as in the case of the first embodiment, and thus has no effect on the recording operation.

When the spot irradiated by the light beam 7 is shifted, and thus the temperature of the previously recorded bit has cooled off, the magnetization direction of the writing layer 6 is again arranged in the magnetization direction of the initialization-use magnetic layer 15 through the switching layer 14.

According to the above arrangement of the magneto-optical disk, the magnetization direction of the writing layer 6 can be arranged in the magnetization direction of the initialization-use magnetic field by the switching layer 14. This permits to reduce the number of the components of the recording-reproducing apparatus because the magnetic field generation device 12 of FIG. 1 for applying the initialization-use magnetic field is no longer required.

Figure 15:
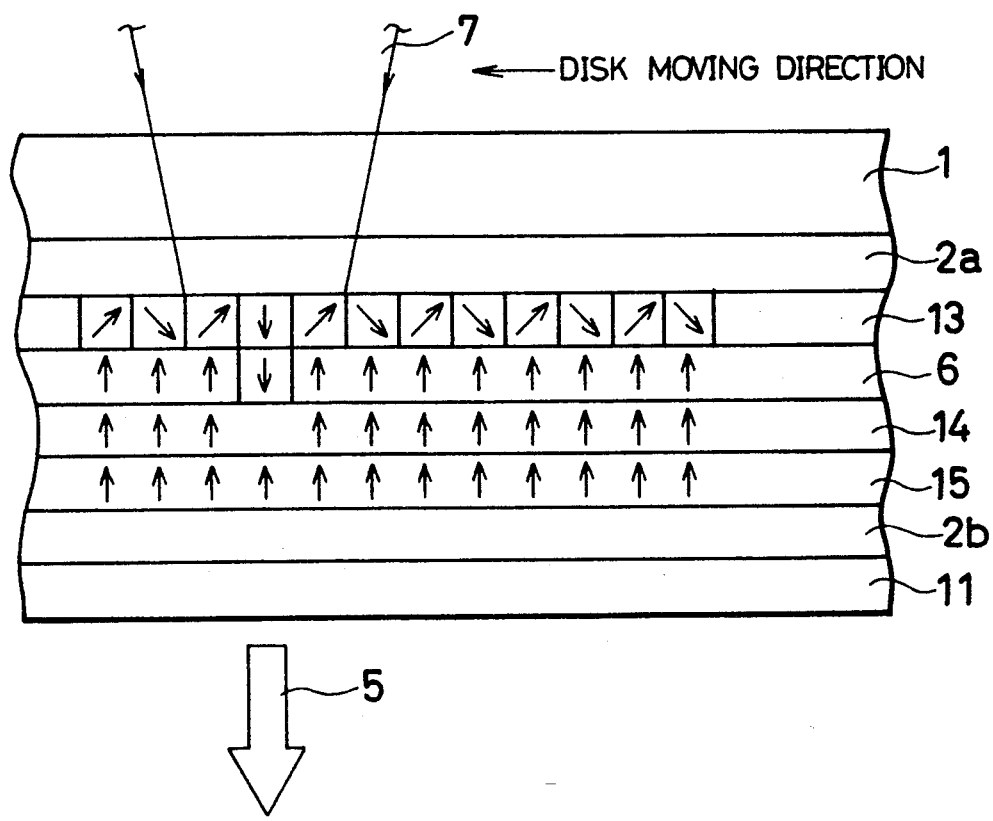
FIG. 15 shows a recording operation on a magneto-optical recording medium having another configuration of the present invention.
Figure 16:
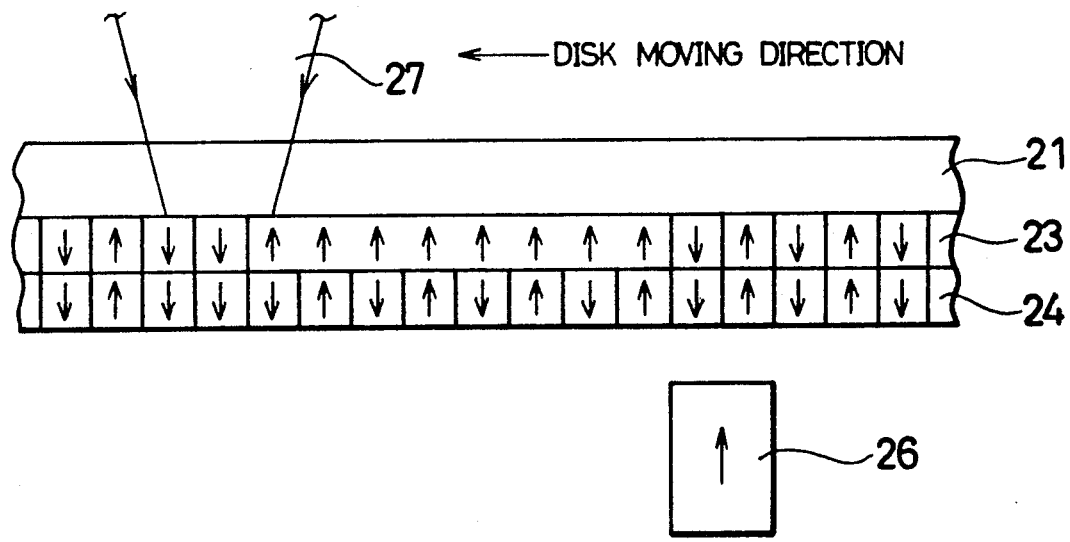
FIG. 16 shows a reproducing operation from a conventional magneto-optical recording medium.

A still another embodiment of the present invention is described hereinbelow, referring to FIG. 15.

A magneto-optical disk employed in the present embodiment differs from that of the second embodiment in that the switching layer 14 and the initialization-use magnetic layer 15 of the third embodiment are further laminated under the writing layer 6. Namely, the magneto-optical recording disk is consisted of the substrate 1, the transparent dielectric film 2a, a recording layer 13, the writing layer 6, the switching layer 14, the initialization-use magnetic layer 15, the transparent dielectric film 2b and the overcoat film 11 that are laminated in this order.

According to the arrangement of the present embodiment, the recording layer and the readout layer are integrated into a single layer. This simplifies the manufacturing processes of the disk compared with the disk having them separately. Moreover, since the switching layer 14 and the initialization-use magnetic layer 15 are provided, the magnetization direction of the writing layer 6 can be arranged in a magnetization direction of the initialization-use magnetic field. This permits to reduce the number of the components because the magnetic field generation device 12 of FIG. 10 is no longer required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium provided with a substrate and a recording-reproduction layer whereon information is recorded magneto-optically, said recording-reproduction layer comprising:

a recording layer for storing information, said recording layer being made of rare earth-transition metal alloys having Curie temperature;

a readout layer made of rare earth-transition metal alloys having Curie temperature that is below the Curie temperature of said recording layer, an easy magnetization axis of said readout layer exhibiting a magnetization perpendicular to said recording layer within a range between a first temperature and a second temperature, and the easy magnetization axis of said readout layer exhibiting magnetization parallel to said recording layer when the temperature is below the first temperature, the first temperature being set below the second temperature and both the first and the second temperatures being set within a range between room temperature and the Curie temperature of said readout layer; and writing layer made of rare earth-transition metal alloys having a Curie temperature that is above the Curie temperature of said recording layer and such coercive force that a magnetization direction thereof is switched by an external magnetic field at room temperature, said readout layer, said recording layer and said writing layer being laminated in this order, wherein as the temperature of said recording-reproduction layer is raised to a temperature within the range between the Curie temperature of said recording layer and the Curie temperature of said writing layer by irradiating thereon with a light beam, the magnetization direction of said recording layer is arranged in a magnetization direction of said writing layer, and as the temperature of said recording-reproduction layer is raised above the Curie temperature of said writing layer, a magnetization direction of said recording layer is arranged in the magnetization direction of an external recording magnetic field.

2. The magneto-optical recording medium as set forth in claim 1, further comprising:

a first transparent dielectric film formed between said recording-reproduction layer and the substrate; and a second transparent dielectric film and an overcoat film, formed on the other surface of said recording-reproduction layer, opposite to the surface whereon said first transparent dielectric film is formed.

3. The magneto-optical recording medium as set forth in claim 1, wherein the rare earth-transition metal alloys of said writing layer comprises TbFeCo having a Curie temperature of 300° C.

4. The magneto-optical recording medium as set forth in claim 3, wherein the TbFeCo comprises $Tb_{0.25}(Fe_{0.8}Co_{0.2})_{0.75}$.

5. The magneto-optical recording medium as set forth in claim 1, wherein the rare earth-transition metal alloys of said recording layer comprises DyFeCo.

6. The magneto-optical recording medium as set forth in claim 1, wherein the rare earth-transition metal alloys of said readout layer comprises GdFeCo, and content of rare-earth metal of the GdFeCo being set greater than that of a composition where the magnetic moments of the rare-earth metal and the transition metal balance one another so that the easy magnetization axis of said readout layer exhibiting the magnetization parallel to said recoding layer at room temperature.

7. The magneto-optical recording medium as set forth in claim 1, wherein the rare earth-transition metal alloys of said readout layer comprises GdCo, and the content of rare-earth metal is set greater than that of a composition where the magnetic moments of the rare-earth metal and the transition metal balance one another so that the easy magnetization axis of said readout layer exhibiting the magnetization perpendicular to said recoding layer at room temperature.

8. The magneto-optical recording medium as set forth in claim 1, wherein said recording-reproduction layer further comprising:
a switching layer made of rare earth-transition metal alloys having a Curie temperature below the Curie temperature of said recording layer; and
an initialization-use magnetic field layer whose magnetization direction is fixed in one direction, having great coercive force from room temperature to the Curie temperature of the naturalization use magnetic field layer,
said switching layer and said initialization-use magnetic field layer being formed in this order on the other surface of said writing layer, opposite to the surface wherein said recording layer is formed.

9. The magneto-optical recording medium as set forth in claim 1 being selected from a group consisted of a magneto-optical disk, a magneto-optical tape, a magneto-optical card.

10. A magneto-optical recording medium provided with a substrate through which a light beam is to be transmitted and a recording-reproduction layer whereon information is recorded,
said recording-reproduction layer comprising:
a recording layer made of rare earth-transition metal alloys having a Curie temperature, easy magnetization axis thereof exhibiting a magnetization perpendicular to said recording layer within a range between a first temperature and the Curie temperature, and the easy magnetization axis thereof exhibiting a magnetization parallel to said recording layer at temperature below the first temperature while keeping components of a perpendicular magnetization, the first temperature being set within a range between room temperature and the Curie temperature; and
writing layer made of rare earth-transition metal alloys having a Curie temperature above the Curie temperature of said recording layer and such coercive force that a magnetization direction thereof is switched by an external magnetic field at room temperature,
said recording layer and said writing layer being laminated in this order on the substrate,
wherein as the temperature of said recording-reproduction layer is raised within a range between the Curie temperature of said recording layer and the Curie temperature of said writing layer by irradiating thereon with a light beam, the magnetization direction of said recording layer is arranged in a magnetization direction of said writing layer, and as the temperature of said recording-reproduction layer is raised above the Curie temperature of said writing layer, a magnetization direction of said recording layer is arranged in the magnetization direction of an external recording magnetic field.

11. The magneto-optical recording medium as set forth in claim 10, wherein the rare earth-transition metal alloys of said writing layer comprises GdTbFe.

12. The magneto-optical recording medium as set forth in claim 11, wherein the GdTbFe includes the content of the rare-earth metal in greater amount than that of a composition where the magnetic moments of the rare-earth metal and the transition metal balance one another so that the easy magnetization axis of said writing layer exhibiting the magnetization parallel to said recoding layer at room temperature.

13. The magneto-optical recording medium as set forth in claim 12, wherein the GdTbFe comprises $(Gd_{0.8}Tb_{0.2})_{0.35}Fe_{0.65}$.

14. The magneto-optical medium as set forth in claim 10, wherein said recording-reproduction layer further comprising:
a switching layer made of rare earth-transition metal alloys having a Curie temperature that is below the Curie temperature of said recording layer; and
an initialization-use magnetic field layer whose magnetization direction is fixed in one direction, having great coercive force from room temperature to the Curie temperature of the naturalization magnetic field layer, said switching layer and said initialization-use magnetic field layer being formed in this order on the other surface of said writing layer, opposite to the surface whereon said recording layer is formed.

15. A system for recording and reproducing information, comprising:
a magneto-optical recording medium provided with a substrate through which a light beam is to be transmitted and a recording-reproduction layer whereon information is recorded magneto-optically; and
a recording and reproduction device;
said recording and reproduction device including:
means for projecting light beams having a plurality of light intensities on said magneto-optical recording medium;
means for applying initialization-use magnetic field to the magneto-optical recording medium; and
means for applying recording magnetic field to the magneto-optical recording medium;
said recording and reproduction layer including:
a recording layer for storing information, said recording layer being made of rare earth-transition metal alloys having Curie temperature;
a readout layer made of rare earth-transition metal alloys having Curie temperature below the Curie temperature of said recording layer, an easy magnetization axis of said readout layer exhibiting a magnetization perpendicular to said recording layer within a range between a first temperature and a second temperature, and the easy magnetization axis of said readout layer exhibiting a magnetization parallel to said recording layer when the temperature is below the first temperature, the first temperature being set below the second temperature and both the first and the second temperatures being set within the range between room temperature and the Curie temperature of said readout layer; and writing layer made of rare earth-transition metal alloys having Curie temperature that is above the Curie temperature of said recording layer and such coercive force that a magnetization direction thereof is switched by an external magnetic field at room temperature, said readout layer, said recording layer and said writing layer being laminated in this order, wherein as the temperature of said recording-reproduction layer is raised to a temperature within the range between the Curie temperature of said recording layer and the Curie temperature of said writing layer by irradiating thereon with a light beam, the magnetization direction of said recording layer is arranged in a magnetization direction of said writing layer, and as the temperature of said recording-reproduction layer is raised above the Curie temperature of said writing layer, a magnetization direction of said recording layer is arranged in the magnetization direction of an external recording magnetic field.

16. A method for recording using an overwriting function on a magneto-optical recording medium comprising a recording-reproduction layer including a recording layer and a writing layer made of rare earth-transition metal alloys whose Curie temperature is above Curie temperature of said recording layer, comprising the steps of:

arranging a magnetization direction of the writing layer in a magnetization direction of an initialization-use magnetic field by initialization-use magnetic field generation means;

projecting a light beam on the magneto-optical recording medium;

raising a temperature of said recording-reproduction layer to a temperature within a range between the Curie temperature of said recording layer and the Curie temperature of said writing layer by irradiation thereon with the light beam;

making the magnetization direction of said recording layer coincident with the magnetization direction of said writing layer;

raising the temperature of said recording-reproduction layer above the Curie temperature of said writing layer by irradiating thereon with the light beam; and making respective magnetization directions of said writing layer and said recording layer opposite to the magnetization direction of the initialization-use magnetic field by an external recording magnetic field.

17. The magneto-optical recording medium as set forth in claim 6 wherein the GdFeCo layer comprises $Gd_{0.28}(Fe_{0.8}Co_{0.2})_{0.72}$.

18. The magneto-optical recording medium as set forth in claim 7 wherein the GdCo layer comprises $Gd_{0.25}Co_{0.075}$.

19. The magneto-optical recording medium as set forth in claim 1, wherein said readout layer is provided on the beam incident side of siad recording layer.

20. The magneto-optical medium as set forth in claim 10, wherein said recording-reproduction layer further comprises a readout layer made of rare earth-transition metal alloys having Curie temperature, said readout layer being provided on the beam incident side of said recording layer.

21. The system for recording and reproducing information as set forth in claim 15, wherein said readout layer is provided on the beam incident side of said recording layer.

22. The method for recording as set forth in claim 16, wherein said recording-reproduction layer further comprises a readout layer, said method further comprising: providing said readout layer on the beam incident side of the recording-reproduction layer.

* * * * *